United States Patent
Shimanuki

[11] Patent Number: 5,890,071
[45] Date of Patent: *Mar. 30, 1999

[54] RADIO TELEPHONE SET WITH BROADCAST RECEIVING FUNCTIONS

[75] Inventor: Masanobu Shimanuki, Yokohama, Japan

[73] Assignee: Toshiba Corporation, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 548,765

[22] Filed: Oct. 26, 1995

[30] Foreign Application Priority Data

Oct. 27, 1994 [JP] Japan .................................. 6-263493

[51] Int. Cl.⁶ .................................................. H04Q 7/04
[52] U.S. Cl. ........................... 704/550; 704/550; 704/403
[58] Field of Search ........................... 379/58, 110, 58 F; 455/345, 346, 344, 38.3, 343, 550, 90, 403

[56] References Cited

U.S. PATENT DOCUMENTS 5,404,355   4/1995   Raith ................................... 455/343 X

*Primary Examiner*—David R. Hudspeth
*Assistant Examiner*—Daniel Abebe
*Attorney, Agent, or Firm*—Finnegan, Henderson, Farabow, Garrett & Dunner, L.L.P.

[57] ABSTRACT

In response to a reception of a incoming signal by a receiver during operation of a turner circuit, a controller shifts a changeover switch and at the same time cause a ringing tone generator to output a ringing tone via a loudspeaker in a tuner section, thereby permitting the user listening to a broadcast to surely hear the ringing tone. In response to an operation to a control panel in a reception state of a telephone receiver, the controller causes the tuner circuit to operate and at the same time controlling a power supply switch to stop on-off switching, keeping the switch on to continuously supply electric power to the telephone section. Thus, power supply noise caused by the intermittent supply of power is prevented from affecting the tuner section, thereby checking a deterioration in the quality of broadcast voice.

26 Claims, 10 Drawing Sheets

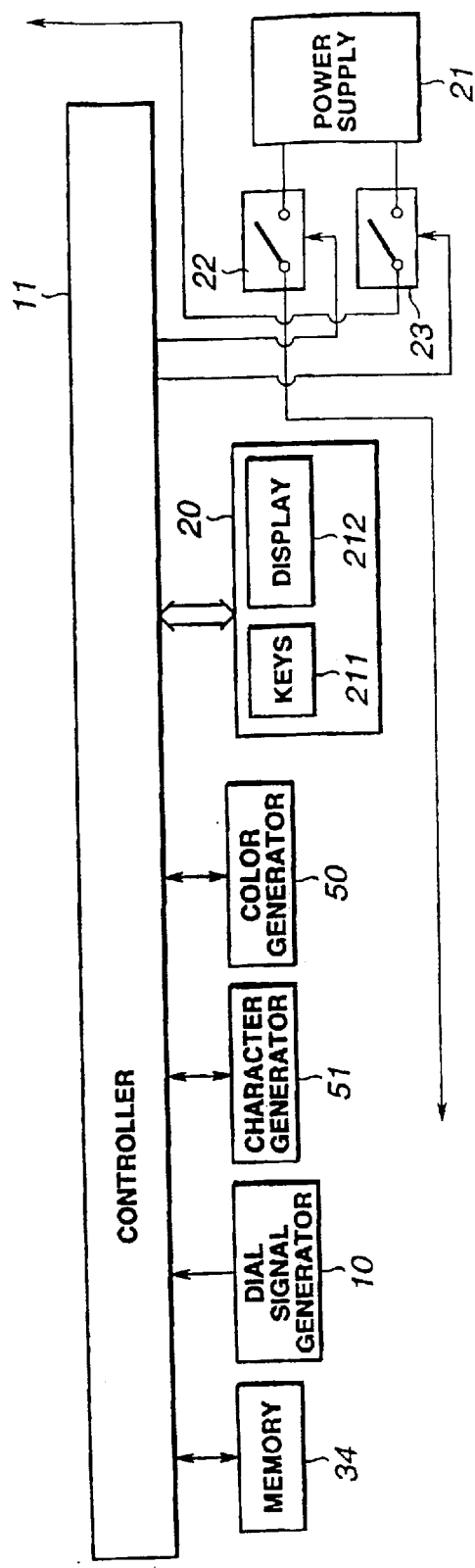

RADIO TELEPHONE SET WITH BROADCAST RECEIVING FUNCTIONS

BACKGROUND OF THE INVENTION a. Field of the Invention

The present invention relates to a radio telephone set or a radio telephone set provided with broadcast receiving functions as well as radio telephone functions and, more specifically, to a radio telephone set in which the way of ring output at the time of a call termination and the way of supplying electric power at the time is adapted for the functions.

b. Description of the Prior Art

A variety of portable telephone sets have been developed and are commercially available so far. However, they are provided with only telephone functions. There have not yet been developed such an article into which a telephone and a radio set have been combined. Since tuner circuits for radio sets etc. have been developed which are very small in size, it is possible to include such tuner circuit in portable telephone sets without changing their size or weight, thereby advantageously permitting such portable telephone sets to be used also as portable radio sets.

However, in a system into which a tuner circuit for radio and a telephone circuit have been simply combined as described above, when a call is terminated while the user is listening to the radio through the headset, he or she may miss the alerting tone informing of the termination, preventing the telephone function from working.

Also, in a portable telephone set, which uses a chargeable battery or an electric cell as a power supply, the power consumption has to be held down to prolong the available time period. For this purpose, the power is saved in a wait state by means of intermittent receiving operation in which the power supply is switched on and off alternately. In this case, noises of the power supply may affect the tuner section during a power supply burst operation, possibly deteriorating the quality of the received audio signal.

SUMMARY OF THE INVENTION

These and other problems are solved, and a technical advance is achieved in accordance with the principles of the invention by providing a radio telephone set which enables the user to be surely notified of termination to the telephone section even during his or her listening to the broadcast sound received by the tuner and which permits the prevention of deterioration in the quality of the received broadcast sound which is caused by the noises of the power supply section.

The invention provides a portable radio telephone set for providing broadcast receiving functions as well as telephone functions enabling radio telephone communications, comprising: telephone means for performing the radio telephone functions; broadcast receiving means for performing the broadcast receiving functions and outputting at least broadcast voice; ringer means responsive to a control signal for generating ringing data and outputting ringing tone based on the ringing data; control means operative on the basis of a first determination that the telephone means have received an incoming signal via radio circuit for supplying the control signal to the ringer means; and the control means further operative on the basis of a second determination that the telephone means have received an incoming signal during operation of the broadcast receiving means for causing the broadcast receiving means to output ringing tone based on the ringing data.

Further, the invention provides a portable radio telephone set for providing broadcast receiving functions as well as telephone functions enabling radio telephone communications, comprising: telephone means for performing the radio telephone functions: means for tuning in to a broadcast wave to reduce the wave at least into a broadcast voice signal; audio output means for receiving an input signal and for controlling the level of, amplifying and outputting the input signal as an audio output; means responsive to a ring request signal for generating ringing data; means for receiving the ringing data and outputting ringing tone based on the ringing data; control means operative on the basis of a first determination that the telephone means have received a incoming signal via radio circuit for supplying the ring request signal to the generating means; the control means further operative on the basis of a second determination that the telephone means have received the incoming signal during operation of the broadcast receiving means for outputting at least one control signal; and transfer means responsive to the at least one control signal for transferring the ringing data as the input signal to the audio output means.

BRIEF DESCRIPTION OF THE DRAWINGS

FIG. 10 is a block diagram showing an arrangement of the subject part in an eighth illustrative embodiment of the invention.

DETAILED DESCRIPTION OF THE PREFERRED EMBODIMENTS

Embodiment I

Figure 1:
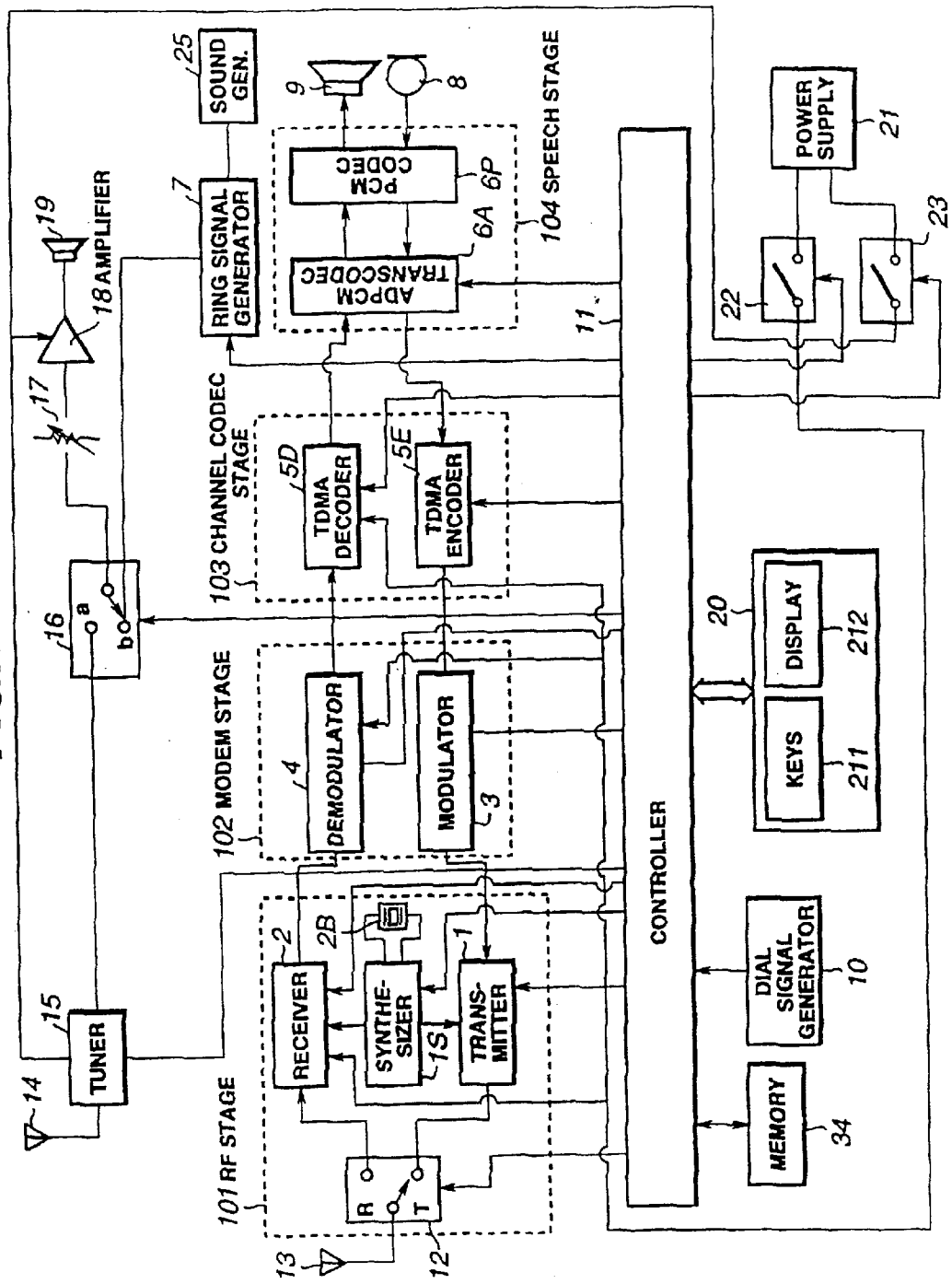
FIG. 1 is a block diagram showing a first illustrative embodiment of a radio telephone set of the invention.

Referring to drawings, we explain a first illustrative embodiment of the invention in the following. FIG. 1 is a block diagram showing a first illustrative embodiment of a radio telephone set of the invention. In FIG. 1, the radio telephone comprises a tuner section or radio receiving section (not defined in the figure), a radio telephone section (not defined in the figure), a controller section (not defined in the figure) provided with a controller 11, and a power supply section (not defined in the figure). The radio telephone further comprises a ringing tone signal generator 7 for generating ringing data and outputting two ringing tone signals based on the data under the control of the controller 11 and a sound generator 25 for receiving one of the ringing tone signals and outputting ringing tone.

The telephone section comprises an antenna 13, a radio-frequency circuit 101, a modem circuit 102. a channel codec circuit 103, a speech codec circuit 104. a loudspeaker 9 and a microphone 8.

The radio-frequency circuit 101 comprises: a changeover switch 12 for switching a transmission and a reception signal to and from the antenna 13 to share the antenna 13 connected to its common terminal; a transmitter 1 having its output connected to one of the alternative terminals of the changeover switch 12 (terminal T); a receiver 2 having its input connected to the other one of the alternative terminals of the changeover switch 12 (terminal R); a synthesizer 1S for supplying signals of predetermined frequencies to the transmitter 1 and receiver 2. All of these elements are controlled by respective control signals from the controller 11. The circuit 101 further comprises an oscillator 2B for supplying an oscillation frequency to the synthesizer 1S.

The modem circuit 102 comprises modulator 3 whose output is connected to the input of the transmitter 1 and a demodulator 4 whose input is connected to the output of the receiver 2, both of which are controlled by respective control signals from the controller 11.

The channel codec circuit 103 comprises a TDMA (time division multiple assess) encoder 5E whose output is connected to the input to the modulator 3 and a TDMA decoder 5D whose input is connected to the output of the demodulator 4, both being controlled by respective control signals from the controller 11.

The speech codec circuit 104 comprises: an ADPCM (adaptive differential pulse code modulation) transcodec 6A whose transcoder output is supplied to the TDMA encoder 5E, whose transdecoder input is derived from the output of the TDMA decoder 5D and whose control input is connected to a control output of the controller 11; and a PCM codec 6P whose coder output is connected to the input to the transcoder input of ADPCM codec 104 and whose decoder input is connected to the output of the transdecoder output of the ADPCM transcodec 6A.

The microphone 8 is connected to the coder input of the PCM codec 6P, and the speaker 9 is connected to the decoder output of the PCM codec 6P.

The tuner section comprises: an antenna 14, a tuner 15 connected to the antenna 14, a changeover switch 16 one alternative terminal 16a of which is connected to the tuner 15 output and the other alternative terminal of which is connected to the ringing tone signal output other than the one connected to the sound generator 25; a volume control 17 connected to the common terminal of the changeover switch 16 for controlling the level of the received audio signal, an amplifier 18 whose input is connected to the output of the volume control 18. and a loudspeaker 19 connected to the output of the amplifier 18.

The controller section comprising, excepting the controller 11, a memory 34 for storing programs and data necessary for operation of the controller 11, a dial signal generation controller 10, and a control panel 20 comprising a key input section 211 for inputting data and a display unit 212. The controller 11 synthetically controls all the other sections.

The power supply section comprises: a power supply 21 for outputting electric powers for a receiving system of the telephone section, (not defined in the figure), the tuner section and the other elements that need power supply; and power supply switches 22 and 23 for switching electric powers for the telephone section and the tuner section, respectively.

Operation of the telephone section is described in the following. In a transmission of telephone speech: speech given by the user is collected and converted into a speech signal by the microphone 8; the speech signal is converted into a PCM coded speech signal in the PCM coded 6P; the PCM coded speech signal is converted into a ADPCM (adaptive differential pulse code modulation) coded speech signal in the ADPCM transcodec 6A; the ADPCM coded speech signal is inserted into a predetermined time slot by the TDMA encoder 5E to become a transmission signal accessible in a TDMA transmission scheme; the transmission signal is subjected to a quadrature phase modulation such as a QPSK (quadrature phase shift keying) modulation in the modulator 3; and the QPSK modulated transmission is converted with a carrier into a RF (radio frequency) transmission signal in the transmitter 1 to feed the antenna 13 for transmission.

Now, we discuss operation of the receiving system (not defined in the figure) of the telephone section, that is, a group of elements in the section which work in the reception of telephone speech, in the following. While the receiving system is in a receiving state, the controller 11 keeps the changeover switch 12 turned to the R side. Then, one of (RF) signals caught by the antenna 13 is selected and converted into a intermediate frequency (IF) signal in the receiver 2. The received IF signal is subjected to a quadrature phase demodulation such as a QPSK demodulation in the demodulator 4, and passed to the TDMA decoder 5D, where the QPSK demodulated signal is converted into an ADPCM speech signal. The ADPCM speech signal is passed to the ADPCM transcodec 6A, where it is converted into a pulse-code modulated speech signal. The pulse-code modulated speech signal is pulse-code demodulated into an analog speech signal in the PCM codec 6P, and output via the loudspeaker 9.

While the receiver 2 is engaged in a receiving operation (which includes receiving for waiting) as described above, the controller 11 controls the power supply switch 22 to turn on and off in synchronism with the operation cycle of the receiver 2 (power burst operation), thereby supplying the electric power for the receiving system of the telephone section from the power supply 21, so that electric power is saved. When the user turns on the tuner section during operation of the receiver 2 by operating the key input section 211 upon the control panel 20, on receiving an on-signal from the section 211, the controller 11 turns on the power switch 23 to supply power to the tuner section, thus starting the reception of radio broadcasting. At the same time, the controller 11 causes the switch 22 to stop its on-off operation and remain on. Thus, the telephone section is stopped from the power burst operation, and changed into continuous operation.

Thereafter, when the user operates the key input section 211 of the control panel 20 to turn off the tuner section, on receiving an off-signal from the key input section 211, the controller 11 makes the switch 23 off to stop supplying electric power to the tuner section, thereby stopping the tuner from receiving a broadcast. At the same time, the controller 11 resumes the on-off control over the power supply switch 22 to intermittently supply electric power to the telephone section for power saving. If the telephone section enters wait state while the tuner section is operating, the controller 11 keeps on the power supply switch 22 to supply power to the telephone section continuously from the beginning of the wait state.

Now, we describe operation of the above described tuner section. Broadcast waves are received by the antenna 14, and one of the waves is selected and demodulated into a broadcast voice signal in the tuner 15. The broadcast voice signal is output to a terminal 16a of the changeover switch 16. Since the switch 16 is kept to the 16a side by the controller 11 while the tuner section is operating, the demodulated broadcast voice signal passes through the switch 16 to reach the volume control 17, which adjust the level thereof. The level-adjusted voice signal is amplified by the amplifier 18 and output from the loudspeaker 19.

Figure 2:
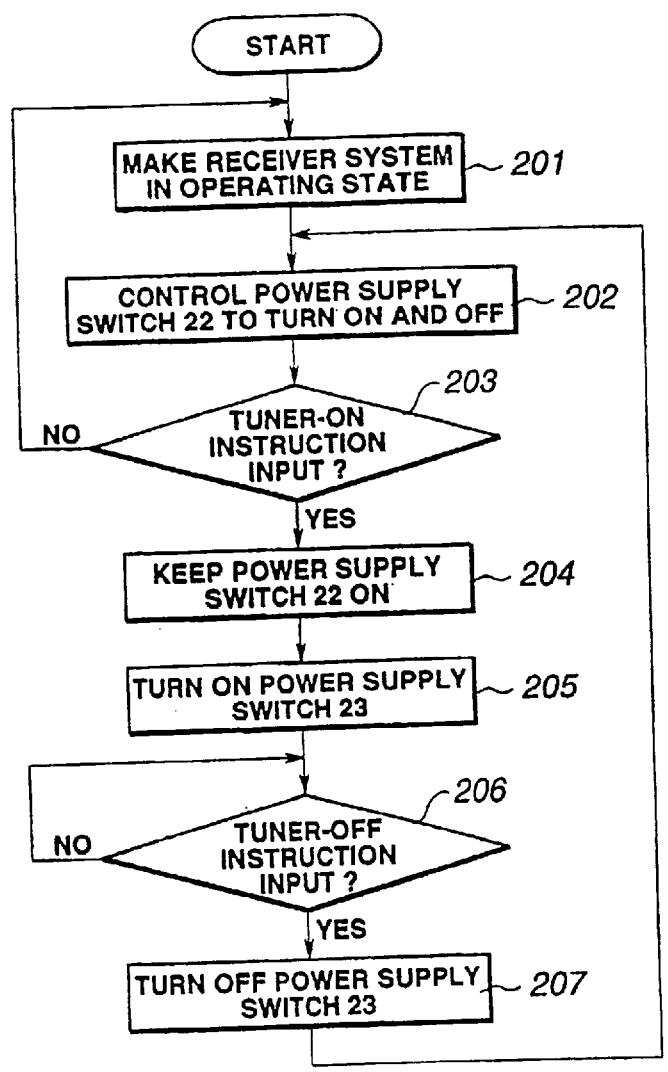
FIG. 2 is a flow chart showing an exemplary operation of power supply switches shown in Fig. 1.

FIG. 2 is a flow chart showing an exemplary operation of the controller 11 in controlling the switch 22 in case of the above mentioned receiver 2 being in a operating state. In step 201. the controller 11 sets the receiving system of the telephone section in an operating state, and concurrently begins an on-off control over the power supply switch 22 to intermittently supply electric power to the receiving system of the telephone section instep 202. During this period of time, the controller 11 determines whether there is an input of an instruction to turn on the tuner section in decision step 203. If not, the controller 11 returns to step 201. If the instruction has been input, the controller 11 advances to step 204.

The controller 11 keeps the switch 22 on in step 204, at the same time turns on the switch 23 to make the tuner section in the operating state instep 205, and then advances to step 206. In decision step 206, the controller 11 determines whether an instruction to turn off the tuner section is input. If the instruction is not input, then the controller 11 repeats to step 206. Otherwise, the controller 11 proceeds to step 207, where it turns off the switch 23 to stop the tuner section from operating, and returns to step 202, where it resumes the on-off control over the power supply switch 22.

Now, we discuss operation involved in termination of a call in case of the telephone section being in await state in the following.

If the telephone section is in a wait state, and the user is listening to a radio broadcast by letting the tuner section operate, then the receiver 2, on receiving a incoming signal from a base station (not shown) via the antenna 13, outputs the incoming signal to the controller 11. In response to the incoming signal, the controller 11 sends a ring request signal to the ringing tone signal generator 7 to activate the generator 7, and change the switch to the 16b. This causes a ringing tone signal output from the ringing tone signal generator 7 to be input to the amplifier 18. Thus, the loudspeaker 19 outputs ringing tone instead of the broadcast voice. It is noted that the ringing tone signal generator 7 causes the sound generator to output ringing tone regardless of whether the tuner section is operating or not. Also, If a incoming signal is received during operation of the tuner section, the controller 11 displays on the display 212 a message informing of a termination of the call on the display 212 on the control panel 20, and flickers the message. This termination message may be displayed at every termination without regard to the operation state of the tuner section.

Figure 3:
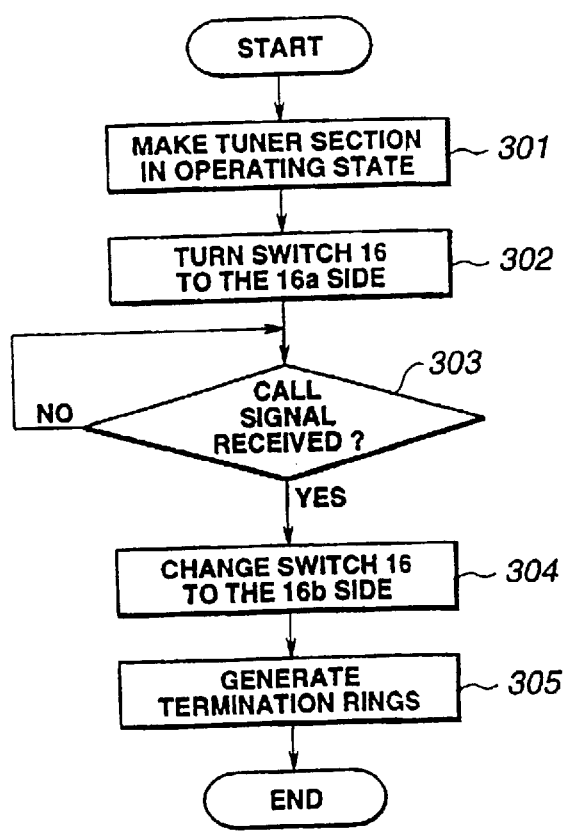
FIG. 3 is a flow chart showing an exemplary operation of an output system which is controlled by the controller shown in FIG. 1.

FIG. 3 shows an exemplary flow of control operation of the controller 11 in outputting ringing tone in case of the tuner section being in an operating state. On entering the control, the controller 11 begins with step 301, where it turns the power supply switch 23 to "on" to make the tuner section in the operating state, and proceeds to step 302 to keep the switch 16 to the 16a side. Then, the controller 11 determines in step 303 whether a incoming signal has been received. If not, the controller 11 repeats step 303. Otherwise, the controller 11 proceeds to step 304, where it turns the switch 16 to the 16b side, and advances to step 305 to cause the ring signal generator 7 to operate and output ringing tone not only from the sound generator 25 but also from the tuner section via the switch 16. The controller 11 then terminates the control operation.

According to the invention, when the tuner section begins operating, the controller 11 turns and keeps on the switch 22, that is, the intermittent power supply to the telephone system is stopped and changed to the continuous power supply, so that it is possible to prevent the quality of the received video and audio signals in the tuner section from deteriorating by preventing noises caused by the intermittent power supply from entering the tuner section. Further, when the telephone section receives a incoming signal while the tuner section is operating, the ringing tone are output from the loudspeaker 19 of the tuner section as well as the sound generator 25, so that it is possible to prevent the user listening to a broadcast with all his or her ears from missing the rings, eliminating a trouble of the user failing to answer the call.

It should be noted that, in another radio telephone system which performs continuous power supplying keeping the switch 22 on without the need of intermittent supply of power from the power supply, the controller 11 performs only the operation shown in FIG. 3 omitting the operation shown in FIG. 2 as is not the case with the receiving system of the above described embodiment. The operation of FIG. 3 can eliminate a trouble of the user failing to answer the call without noticing the ringing tone.

It is also preferable to provide the system with a light emitting diode (LED) which emits light (or flickers) concurrent with the sound generator 25 in response to the incoming signal. In this case, since the emitted light indicates the call termination, which is especially convenient for, e.g., use at night.

Embodiment II

Figure 4:
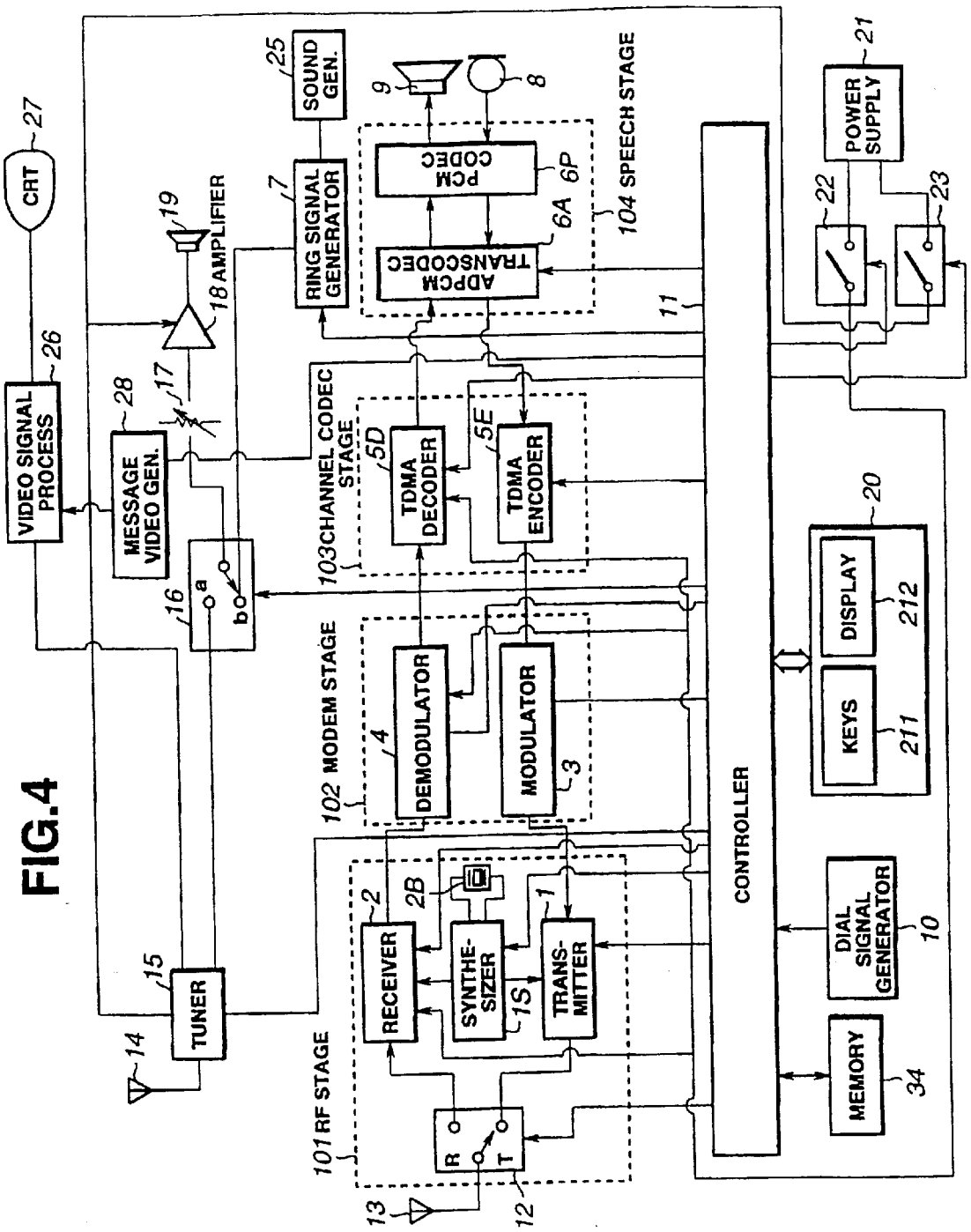
FIG. 4 is a block diagram showing a second illustrative embodiment of the invention.

FIG. 4 is a block diagram showing a second illustrative embodiment of the invention. The second embodiment only differs from the first embodiment in that this embodiment is provided with a video tuner 45 for receiving TV broadcasting instead of the radio tuner 15, and therefore further comprising a video signal processor 26, a message video generator 28 and a CRT 27. The tuner 45 outputs a received video signal to the video signal processor 26, where the video signal is subjected to some kinds of processing, and passed to the CRT 27, on which the processed video signal is displayed. While an audio signal received by. the tuner 45 is passed through the switch 16 and the volume control 17 to the loudspeaker 19, and output therefrom.

In the second embodiment, if the receiver 2 of the telephone section receives a incoming signal while the tuner 45 is operating, again, the controller 11 turns the switch 16 to the 16b side to cause the ring signal generated from the ringing tone signal generator 7 to be output via the loudspeaker 19, and activates and causes the message video generator 28 to generate a message to the effect that a call is received and output it to the video signal processor 26. The video signal processor 26 superimposes the message over the received video signal for displaying on the CRT 27. The message may be displayed as, for example, "Here is a call for you!"

Thus, in this embodiment, the user is informed of an incoming call to the telephone section by means of not only the voice from the loudspeaker 19 but also visual information on the CRT 27. That is, the embodiment enables the user to be more surely informed of the incoming call.

Also, it is noted that the controller 11, in response to a start of operation of the tuner section, turns and keeps on the switch 22, that is, the intermittent power supply to the telephone system is stopped and changed to the continuous power supply, so that it is possible to prevent the quality of the received video and audio signals in the tuner section from deteriorating by preventing noises caused by the intermittent power supply from entering the tuner section.

Embodiment III

Figure 5:
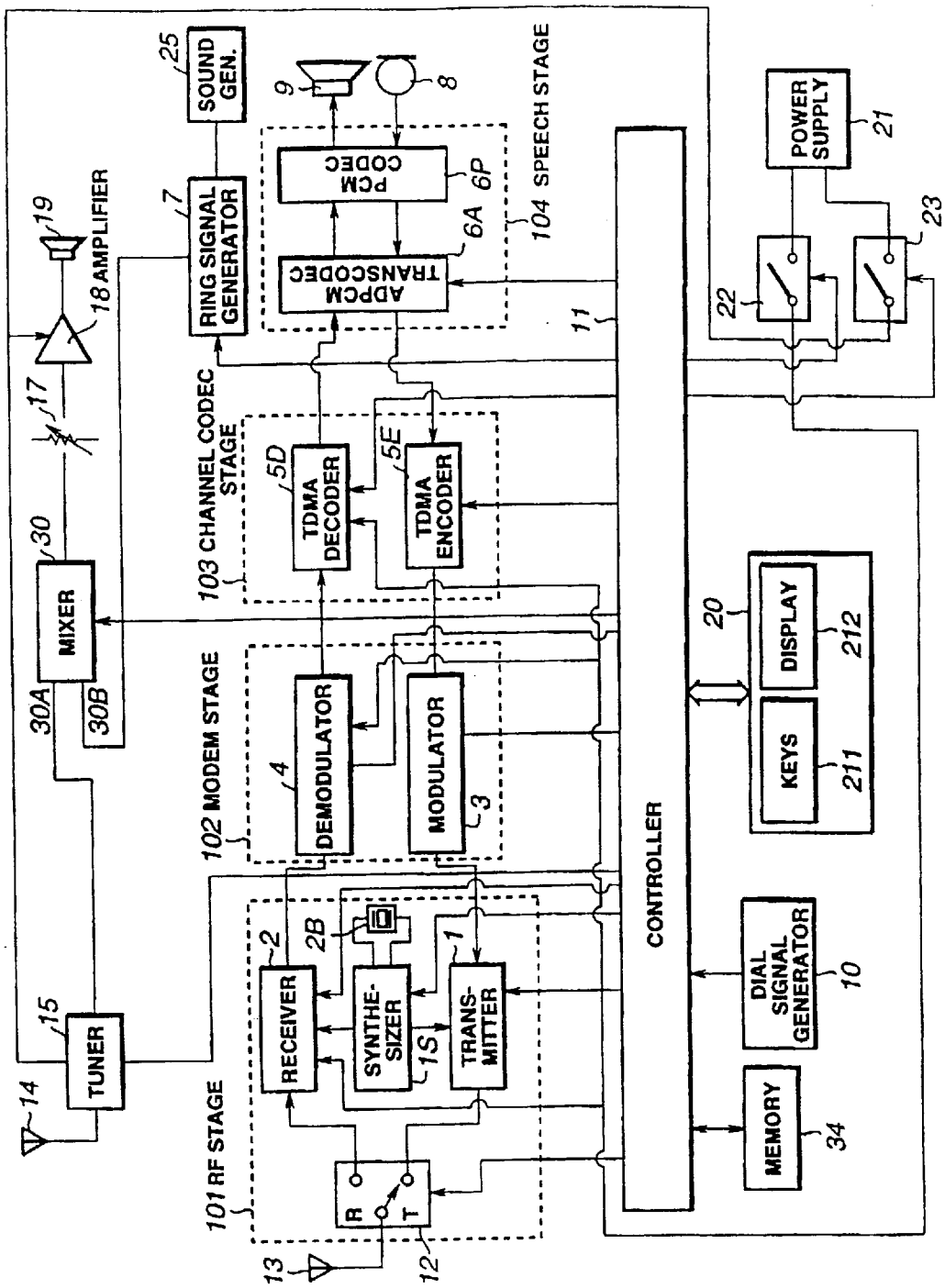
FIG. 5 is a block diagram showing a third illustrative embodiment of the invention.

FIG. 5 is a block diagram showing a third illustrative embodiment of the invention. The radio telephone of the third embodiment is identical to the first illustrative embodiment except that the switch 16 has been replaced by a mixer 30 in the third embodiment. The mixer 30 has an adjustable input 30A, a fixed input 30B, a control input for adjusting the level of the 30A-input component of the output, and an output terminal 30S. Assuming the levels of the input 30A and 30B and the output 30S to be X, Y, S respectively, the mixer 30 maintains the following relationship:

$$S \propto \alpha X + Y,$$

where $\alpha$ is a coefficient set by the control input, and $0 \leq \alpha \leq 1$.

In FIG. 5, during operation of the tuner section, the controller 11 usually applies such a signal to the control input of the mixer 30 as to make the coefficient $\alpha=1$. So, a received broadcast voice signal output from the tuner 15 is output through the mixer 30, the volume control 17, the amplifier 18 and the loudspeaker 19.

In this arrangement, when the telephone receives an incoming signal while the tuner 15 is operating, the controller 11 controls the ringing tone signal generator 7 to operate, and also controls the mixer 30 to make the coefficient a predetermined value. Through these controls, the received voice signal is lowered in the level by the coefficient $\alpha$ of the mixer 30, and input to the amplifier 18 via the volume control 17. while a ringing tone signal generated from the ringing tone signal generator 7 is input to the amplifier 18 via the mixer 30 and the volume control 17.

Accordingly, the broadcast voice of a lowered level and ringing tone are concurrently output from the loudspeaker 19. Thus, the embodiment can eliminate a trouble of the user failing to answer a call without noticing the ringing tone while listing to a broadcast with rapt attention.

Note that the coefficient can be set by the user through the key input section 211 of the panel 20. The user can continue to listen to the broadcast while having a conversation through the telephone by adjusting the coefficient. This is especially practical when this embodiment is combined with the next embodiment, because the use of a headset 24, headphone or earphone will eliminate the possibility of the other party noticing that the user is listening to the broadcast.

Embodiment IV

Figure 6:
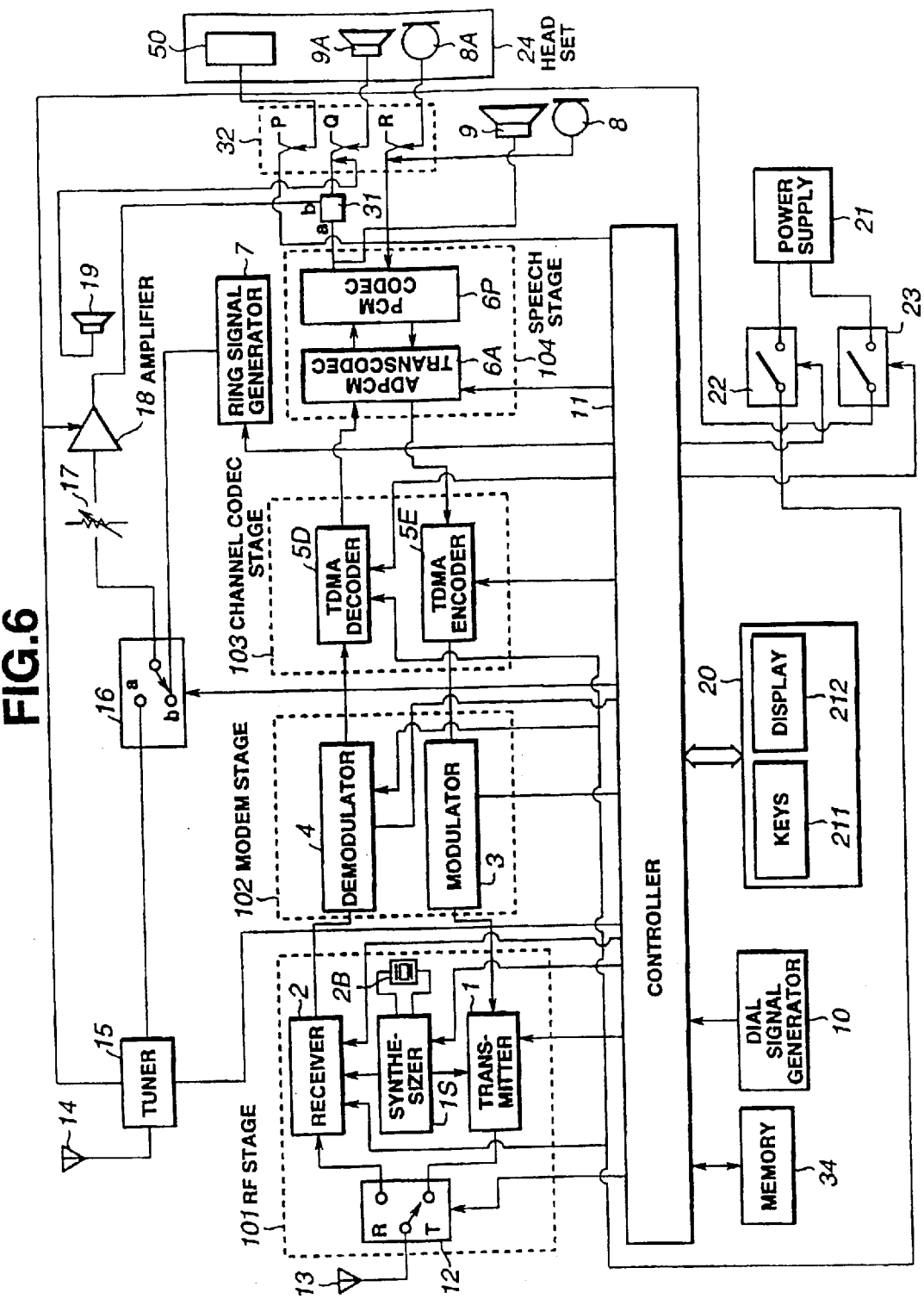
FIG. 6 is a block diagram showing a fourth illustrative embodiment of the invention.

FIG. 6 is a block diagram showing a fourth illustrative embodiment of the invention. A radio telephone set according to this embodiment is adapted to have a facility for connecting a headset 24 to the body of the telephone set. For this purpose, the embodiment is provided with a mixer 31, a headset 24 jack 32 and a headset 24 as shown in FIG. 6. The connections among relevant elements are such that when the plug of the headset 24 is inserted into the headset 24 jack 32: a microphone 8A of the headset 24 is connected to the coder input of the PCM codec 6P via terminal 32R of the jack 32, causing the microphone 8 to be disconnected from the coder input of the PCM codec 6P; a speaker 9A of the headset 24 is connected to the output of the mixer 31 via terminal 32Q of the jack 32, causing the loudspeaker 19 to be disconnected from the output of the mixer 31; and one terminal (not shown) of a remote switch 50 attached to the headset 24 is connected to an input of the controller 11 via terminal 32P of the jack 32. One input 31a of the mixer 31 is connected to the decoder output of the PCM codec 6P and the loudspeaker 9, and the other input 31b is connected to the amplifier 18 output. In order for the user to be able to listen to a broadcast voice received by the tuner 15 through the headset 24, the voice signal output from the amplifier 18 is output to the terminal 32Q of the jack 32 via the mixer 31. It is noted that the mixer 31 is so arranged that the output of the amplifier 18 is not leaked to the loudspeaker 9.

If the receiver 2 receives a incoming signal when the user is listening to a broadcast received by the tuner 15 with the headset 24, the controller 11 turns the switch 16 to the 16b side to output the ringing tone signal generated by the ringing tone signal generator 7 to the speaker 9A of the headset 24 via the amplifier 18, so that it is possible to prevent even a user listening to a broadcast with the headset 24 from missing the rings, eliminating a trouble of the user failing to answer the call. Also, if the user hears the ringing tone while listening to a broadcast with the headset 24, the user can press the remote switch 50 attached to the headset 24 to send a hook signal to the controller 11 via jack terminal 32P. Thus, the user can answer the call by making the telephone section in the off-hook state. If the user desires to end the call, he or she can make the telephone section in the on-hook state to disconnect the line by pressing the remote switch 50 again to send another hook signal to the controller 11 via jack terminal 32P. Then, the controller 11 turns the switch 16 back to the 16a side to cause the broadcast voice signal to be transferred to the headset 24. In this way, the easiness in handling the embodiment is significantly increased.

If the receiver 2 receives a incoming signal when the tuner section is not operating (that is, when the switch 23 is off and the switch 16 is set to the 16b side), the controller 11 turns on the switch 23 to cause the amplifier 18 to operate, and activate the ringing tone signal generator 7. By doing this, the ringing tone signal is output to either the loudspeaker 19 or the speaker of the headset 24 if connected, via the amplifier 18, the mixer 31 and the jack terminal 32Q. Thereafter, in response to a hook signal from the key input section 211 or the remote switch 50 attached to the headset 24 if connected, the controller 11 stops the generator 7 from operating, turns off the switch 23 to inactivate the amplifier 18, and then makes the telephone section in the off-hook state. If the user is to end the call, he or she can send another hook signal from the key input section 211 or the remote switch 50 attached to the headset 24 If connected to cause the controller 11 to make the telephone section in the on-hook state.

In this embodiment, in response to a start of operation of the tuner section, again, the controller 11 turns and keeps on the switch 22, that is, the intermittent power supply to the telephone system is stopped and changed to the continuous power supply, so that it is possible to prevent the quality of the received video and audio signals in the tuner section from deteriorating by preventing noises caused by the intermittent power supply from entering the tuner section.

Though just described embodiment uses a headset 24 and a jack for the headset 24, a headphone and a headphone jack may be used instead of the headset 24 and the headset 24 jack. The circuit of this variation is different from the original embodiment only in that the microphone 8 is directly connected to the decoder input of the PCM codec 6P. The control operation by the controller 11 in the variation is identical to that of the original embodiment. In this case, if the user is to use the telephone function while wearing the headphone, he or she will use the microphone 8 while keep wearing the headphone.

Embodiment V

Figure 7:
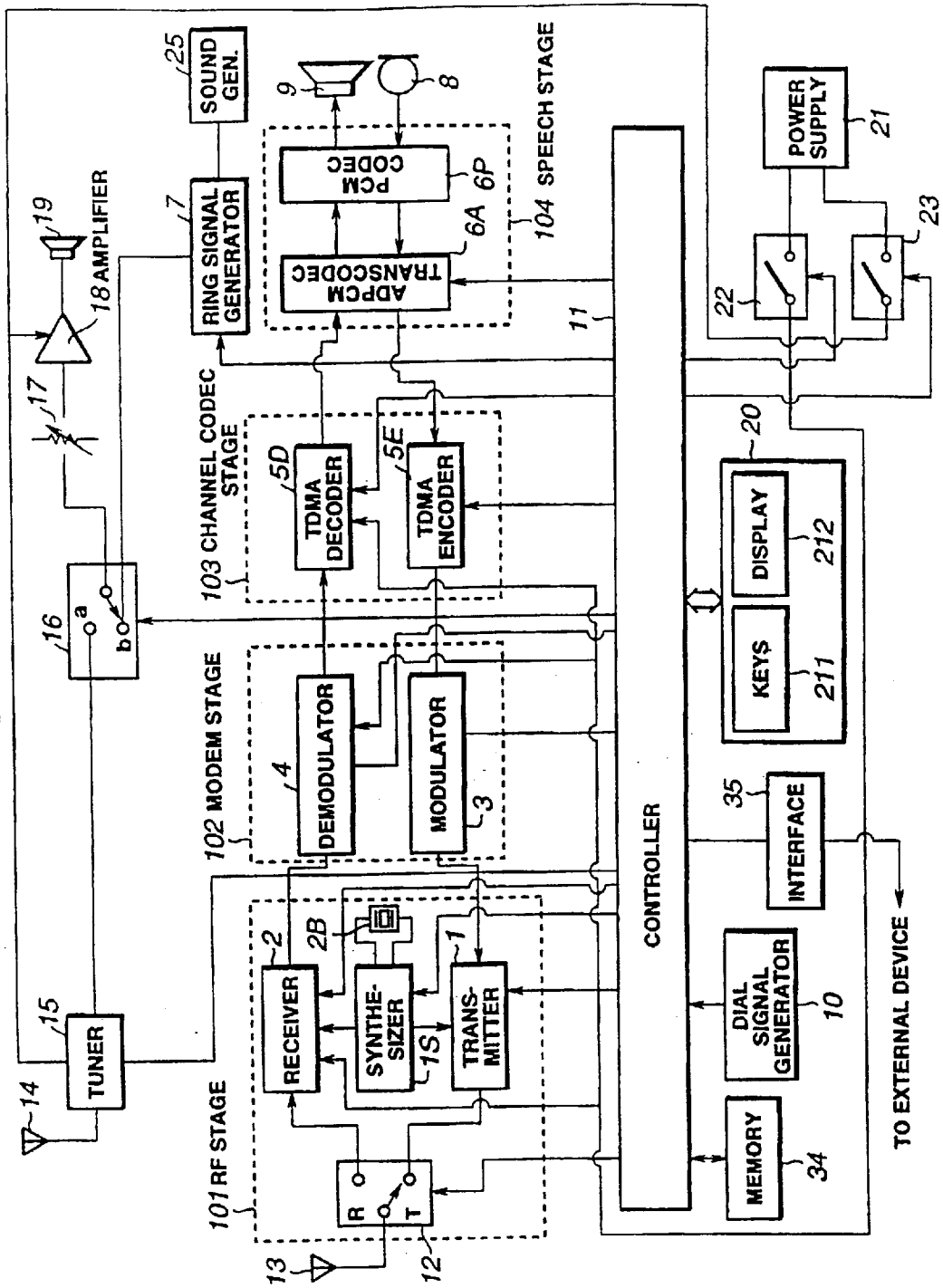
FIG. 7 is a block diagram showing a fifth illustrative embodiment of the invention.

FIG. 7 is a block diagram showing a fifth illustrative embodiment of the invention. This embodiment is identical to the first embodiment except that the embodiment is provided with an interface 35 through which an external terminal device (not shown) such as a microcomputer can be detachably connected to the controller 11. The interface preferably follows one of the international standard specifications on data input/output of data terminal devices.

To the interface 35 there can be connected an external device of various sorts such as a facsimile, an information device like an electronic pocketbook, etc, which, in turn, enables a data transfer between the external device and the channel codec circuit 103 via the controller 11. Therefore, the user can send via radio circuit the data input from the external device through the controller 11, the TDMA encoder SE, the modulator 3, the transmitter 1 and the antenna 13, and output to the external device the data received from the antenna 13 via the receiver 2, the demodulator 4, the TDMA decoder SE. and the controller 11.

In operation in case of an external device being connected to the interface 35 for data communication as described above, on detecting a termination of a call during operation of the tuner 15, the controller 11, again, tunes the switch 16 to the 16b side to output the ringing tone generated by the ringing tone signal generator 7 via audio output system of the tuner section, and display a message to the effect that a call is incoming on the display 212 of the control panel 20. Thus, the embodiment can eliminate a trouble of the user failing to answer a call without noticing the ringing tone while listing to a broadcast with rapt attention. Note that displaying the message may be practiced regardless of whether the tuner section is operating or not.

Also, the controller 11, in response to a start of operation of the tuner section, turns and keeps on the switch 22, that is, the intermittent power supply to the telephone system is stopped and changed to the continuous power supply, so that it is possible to prevent the quality of the received audio signal (and the video signal if the tuner section comprises a TV tuner) in the tuner section from deteriorating by preventing noises caused by the intermittent power supply from entering the tuner section.

Embodiment VI

Though in the above illustrative embodiment we described a case in which a broadcast voice is output from the broadcast wave received by the tuner 15, a radio telephone may be adapted to display teletext information transmitted together with a normal FM signal on the display 212 of the control panel 20.

Figure 8:
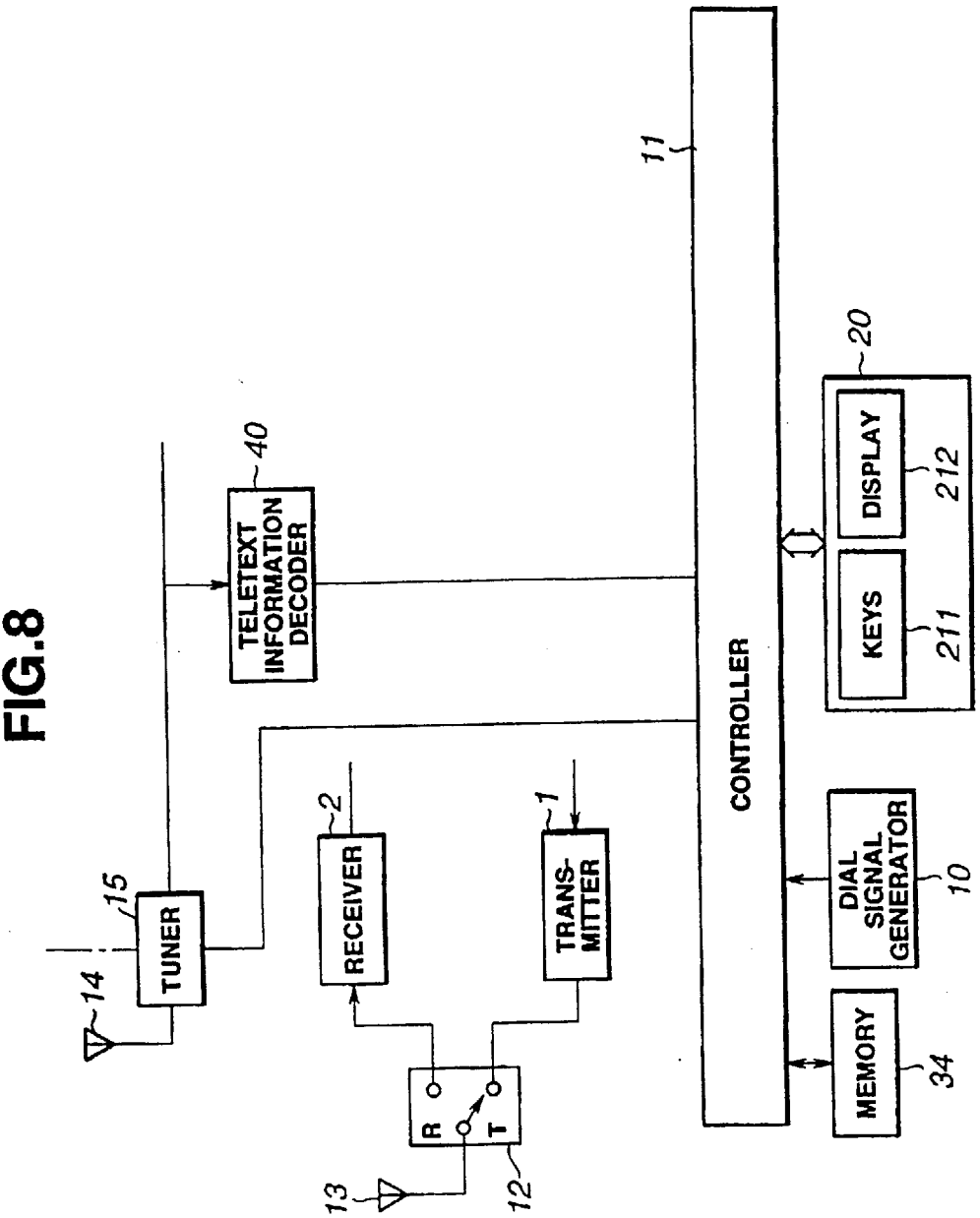
FIG. 8 is a block diagram showing an arrangement of the subject part in a sixth illustrative embodiment of the invention.

FIG. 8 is a partial block diagram showing an arrangement of relevant parts of a sixth illustrative embodiment, of the invention, in which teletext information is displayed. In FIG. 8, the tuner 15 outputs, from a received FM or TV broadcast wave, a broadcast voice, a broadcast video in case of a TV tuner and a teletext signal transmitted together with the broadcast signal. The teletext signal is input to the teletext information decoder 40, which outputs a decoded teletext information to the controller 11. If an instruction of displaying teletext information has been set through the key input section 211 of the control panel 20, the controller 11 controls the display 212 to display teletext information.

Thus, the user can view teletext information as well as listen to a broadcast voice during the reception of an FM broadcast. Also, during the reception of a TV broadcast, the user can view both pictures and teletext information of the broadcast. Specifically, If the setting is such that teletext is displayed on the display 212 when outputting of the received broadcast voice is stopped to output only the ringing tone in response to an incoming call, the teletext can keep the user informed of the broadcast contents. The embodiment also enables teletext information different from the content of the broadcast voice to be received.

Embodiment VII

In the above described embodiments, which uses a charging battery for the power supply 21, the voltage of the power supply may be detected and displayed.

Figure 9:
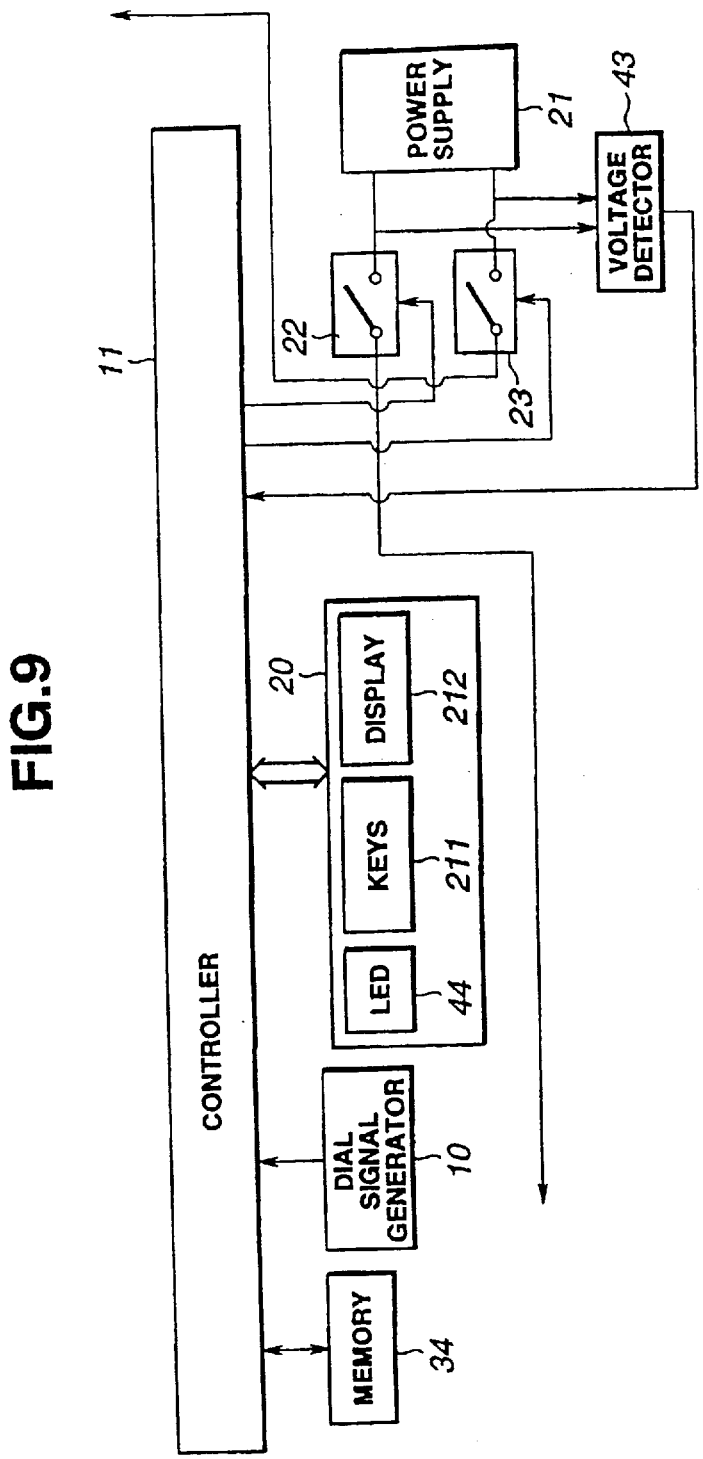
FIG. 9 is a block diagram showing an arrangement of the subject part in a seventh illustrative embodiment of the invention.

FIG. 9 is a partial block diagram showing an arrangement of relevant parts of a seventh illustrative embodiment, of the invention, in which the charging battery voltage of the power supply 21 is detected. The embodiment is provided with a voltage detector 43 for detecting the voltage of the charging battery (not shown) of the power sully 21 and informing the controller 11 of the detected value, and an LED 44 for lighting or stopping the lighting to indicate whether the remaining capacity of the charging battery is larger or smaller than a prescribed value. If the voltage detector 43 detects an available lower limit voltage in the course of lowering of the voltage of the charging battery of the power supply 21, the voltage detector 43 informs the controller 11 that the remaining capacity of the charging battery is less than the prescribed value.

Then, the controller 11 displays on the display 212 a message that the remaining capacity of the charging battery is less than the prescribed value. If the remaining capacity of the charging battery is more than the prescribed value, then the controller 11 displays a message to that effect on the display 212. Further, by keeping records of transmission and reception times since the completion of charging, the remaining time available for subsequent transmission and reception may be displayed on the basis of the remaining capacity of the charging battery.

In place of displaying on the display 212, the controller 11 may turn off the LED 44 if the remaining capacity of the charging battery of the power supply 21 is more than a prescribed value, and turn on the LED 44 if the remaining capacity of the charging battery is less than the prescribed value. As a result, the user can make sure the remaining available time. Further, lighting the LED 44 in case of less than the prescribed value facilitates a decision at night on whether the charging battery is available.

Returning now to the third embodiment of FIG. 5, the received voice signal output from the tuner 15 is attenuated by the coefficient $\alpha$ to lower the level of the signal, and output together with the ringing tone signal. Thus, the level of the voice signal to the amplifier 18 is lower by the attenuation due to the coefficient $\alpha$ than the level of the voice signal which would be set by the volume control 17 alone. In this case, the attenuation of the voice level may be adjusted by the step by including a step-variable attenuator in the mixer 30. By this, the user can set from the outside the level of the voice output considering the environment, e.g., the ambient noise.

Also, in the fourth embodiment of FIG. 6, when the receiver 2 receives a incoming signal while the user is listing to a broadcast, the switching operation is such that the ringing tone are output only via the speaker of the headset 24. However, it may be so devised that the controller 11 controls the ringing tone to be output through the speaker of the headset 24 but also the loudspeaker 19 and/or the sound generator 25 shown in FIG. 1. For doing this, the user can enter the instruction in the controller 11 through the key input section 211 of the control panel 20. By doing this, the user can surely hear the ringing tone even when he or she is not wearing the headphone or headset 24.

Embodiment VIII

In the above illustrative embodiment, an incoming call is notified by means of a blinking message displayed on the display 212, ringing tone from the sound generator 25 and/or a light of the LED 44, so that the user can be surely informed of the incoming call even in such a dark situation as at night. Additionally, a message informing of an incoming call may be represented by a mark or a character and by further using colors, thereby facilitating the recognition by the user of the incoming call.

FIG. 10 is a partial block diagram showing an arrangement of relevant parts of an eighth illustrative embodiment, of the invention, in which the termination message informing of an incoming call is represented by a mark or a character and by further using colors. The embodiment shown in FIG. 10 is provided with a color signal generator 50 for displaying a message colored red, yellow, green, etc., and a character generator 51 for displaying a message by means of a mark or character. A desired color, mark and/or character are set in the controller 11 through the key input section 211 of the control panel 20. In this embodiment, if there is an incoming call, the controller 11 controls the character generator 51 and the color signal generator 51 to display a mark or a character assigned to the termination message and colored a specified color, e.g., a bell mark colored, e.g., red, making the mark or the character blinking. Thus, the embodiment makes an incoming call easier for the user to recognize.

Conclusion

Though the present invention has been described in terms of some illustrative embodiments, it is apparent to those of ordinary skill in the art that other various arrangements may be constructed without departing from the spirit and scope of the present invention.

For example, the ringing tone may be output via the amplifier 18 and the loudspeaker 19 regardless of the operation of the tuner 15 by using another power supply switch to control the tuner 15 and the amplifier 18 independently instead of using a sound generator 25.

Also, the last circuit of the receiving system in the radio telephone section, that is, the PCM codec may include an output circuit which permits the user to adjust the output level of the received speech.

It should be therefore understand that the present invention is not limited to the specific embodiments described in the specification, but rather be construed broadly within its spirit and scope as defined by elements set out in the appended claims.

What is claimed is:

1. A radio communication apparatus, comprising:
   a radio communication section having a speaker, a microphone, receiving means for receiving signals from a communication network via an antenna, transmitting means for transmitting signals inputted from the microphone to the communication network via the antenna;
   broadcast receiving means having a tuner for selecting one broadcast wave from radio waves and demodulating into broadcast voice or image signals, and outputting means for outputting broadcast voices or images based on the broadcast signals;
   incoming signal detecting means for detecting an incoming signal from the receiving means of the radio communication section;
   power supply means for supplying electric power to the radio communication section, the broadcast receiving means. and other parts of the radio communication apparatus;
   broadcast setting means for setting the broadcast receiving means active or inactive;
   communication setting means for setting the radio communication section active or inactive;
   broadcast power supply controlling means for controlling supplying of electric power to the broadcast receiving means, in response to an operation of the broadcast setting means;
   supplying means for supplying intermittently electric power to the incoming signal detecting means when the communication setting means sets the radio communication section inactive; and
   controlling means for detecting whether the broadcast setting means sets the broadcast receiving means active or inactive, for permitting action of the supplying means when the broadcast setting means sets the broadcast receiving means active, for inhibiting action of the supplying means and supplying continuously electric power to the incoming signal detecting means when the broadcast setting means sets the broadcast receiving means active.

2. The apparatus of claim 1, wherein said broadcast receiving means comprises:
   tuning means for tuning in to a broadcast voice signal; and
   audio output means for receiving an input signal and for controlling the level of amplifying and outputting said input signal as an audio output.

3. The apparatus of claim 2, further comprising:
   means responsive to a second determination that said telephone means have received said incoming signal during operation of said broadcast receiving means for outputting at least one control signal; and
   first transfer means responsive to said at least one control signal for transferring ringing data as said input signal to said audio output means.

4. The apparatus of claim 3 wherein said transfer means comprises:
   means responsive to said at least one control signal for selectively connecting one of said broadcast voice signal and said ringing data to said audio output means.

5. The apparatus of claim 3 wherein said transfer means comprising:
   means responsive to said at least one control signal for transferring a mixture of said ringing data and an attenuated version of said broadcast voice signal as said input signal to said audio output means.

6. The apparatus of claim 5 wherein said transfer means comprises:
   means for permitting the user to set the attenuation amount of said attenuated version of said broadcast voice from the outside.

7. The apparatus of claim 3, further comprising:

tone generating means for generating a ringing tone;

second transfer means for receiving an audio signal and the ringing tone from the tone generating means, and outputting a mixture of said audio signal and the ringing tone; and a connection jack for effecting a first electrical connection between said set and a head gear having at least a headphone or earphone function in such a way that said mixture output from said second transfer means is coupled with the tone generating means, as long as said head gear is not inserted into said connection jack, while inserting said head gear into said connection jack causes said mixture output from said second transfer means to be output as an audio output by means of said headphone or earphone function.

8. The apparatus of claim 2 wherein:

said tuning means comprises a TV broadcast receiving circuit; and the audio output of said circuit is output via said audio output means, said apparatus further comprising:

display means for displaying the video output of said circuit.

9. The apparatus of claim 1, further comprising:

interface means through which an external device is detachably connected to said set so as to enable an external device to communicate data to said transmitting system and from said receiving system.

10. The apparatus of claim 9 wherein:

said external device is any of data terminal devices, computers, and facsimile device.

11. The apparatus of claim 1 wherein said broadcast receiving means comprises a radio broadcast receiver.

12. The apparatus of claim 1 wherein said broadcast receiving means comprises a TV broadcast receiver.

13. The apparatus of claim 1, further comprising:

tone generating means for generating a ringing tone in response to the incoming signal detecting means;

tone outputting means for outputting the ringing tone from the tone generating means.

14. The apparatus of claim 13, further comprising:

message display means for displaying a message composed of a mark indicating reception of said incoming signal, concurrently with said output of said ringing tone.

15. The apparatus of claim 14, wherein said message display means comprises:

color message display means operative during operation of said broadcast receiving means for displaying in color a message composed of a mark indicating reception of said incoming signal, concurrently with said output of said ringing tone.

16. The apparatus of claim 14, wherein said message display means comprises:

blinking message display means operative during operation of said broadcast receiving means for displaying a blinking message composed of a mark indicating reception of said incoming signal, concurrently with said output of said ringing tone.

17. The apparatus of claim 14, wherein said message display means comprises a cathode ray tube for displaying video output of said set and the message.

18. The apparatus of claim 17, wherein said message display means displaying the message of receiving the incoming signal on part of the CRT screen.

19. The apparatus of claim 13, further comprising:

message display means for displaying a message composed of a character indicating reception of said incoming signal, concurrently with said output of said ringing tone.

20. The apparatus of claim 19, wherein said message display means comprises:

color message display means for displaying in color a message composed of a character indicating reception of said incoming signal, concurrently with said output of said ringing tone.

21. The apparatus of claim 19, wherein said message display means comprises:

blinking message display means operative during operation of said broadcast receiving means for displaying a blinking message composed of a character indicating reception of said incoming signal, concurrently with said output of said ringing tone.

22. The apparatus of claim 19, wherein the power supply means includes a battery, and said message display means comprises:

means for detecting remaining capacity of said battery; and means for displaying said remaining capacity of said battery.

23. The apparatus of claim 22 wherein said means for displaying comprises:

means responsive to a determination that said remaining capacity of said battery is larger than a predetermined value for displaying a first message to the that effect; and means responsive to a determination that said remaining capacity of said battery is not larger than a predetermined value for displaying a second message to the that effect.

24. The apparatus of claim 19 wherein said message display means comprise:

means for deriving teletext information from said broadcast receiving means; and means for visually display said teletext information.

25. The apparatus of claim 1 further comprising:

means responsive to said output of said ringing tone for emitting light for alerting the user.

26. A radio communication apparatus, comprising:

a radio communication section having a speaker, a microphone receiving means for receiving signals from a communication network via an antenna, transmitting means for transmitting signals inputted from the microphone to the communication network via the antenna;

broadcast receiving means having a tuner for selecting one broadcast wave from radio waves and demodulating into broadcast voice or image signals, and outputting means for outputting broadcast voices or images based on the broadcast signals;

incoming signal detecting means for detecting an incoming signal from the receiving means;

power supply means for supplying electric power to the radio communication section, the broadcast receiving means, and other parts of the radio communication apparatus;

broadcast setting means for setting the broadcast receiving means active or inactive;

communication setting means for setting the radio communication section active or inactive;

power supply controlling means for controlling the power supply means to supply electric power to the incoming signal detecting means intermittently when the broadcast setting means set the broadcast receiving means inactive and the communication setting means sets the radio communication means inactive, and for controlling the power supply means to supply electric power to the incoming signal detecting means continuously when the broadcast setting means sets the broadcast receiving means active.

* * * * *